United States Patent [19]
El-Antably et al.

[11] Patent Number: 5,296,773
[45] Date of Patent: Mar. 22, 1994

[54] COMPOSITE ROTOR FOR A SYNCHRONOUS RELUCTANCE MACHINE

[75] Inventors: Ahmed M. El-Antably, Indianapolis; Donald Klemen, Carmel, both of Ind.

[73] Assignee: General Motors Corporation, Detroit, Mich.

[21] Appl. No.: 48,913

[22] Filed: Apr. 20, 1993

[51] Int. Cl.⁵ .............................. H02K 1/22
[52] U.S. Cl. .................. 310/261; 310/106; 310/156; 310/162; 310/216
[58] Field of Search ............. 310/261, 262, 264, 42, 310/162-165, 216, 89, 166, 91, 217, 106, 156; 318/701

[56] References Cited

U.S. PATENT DOCUMENTS

| | | | |
|---|---|---|---|
| 3,671,789 | 6/1972 | Menzies | 310/163 |
| 3,679,924 | 7/1972 | Menzies | 310/163 |
| 4,510,680 | 4/1985 | Miller | 310/42 |
| 4,614,888 | 9/1986 | Mosher | 310/261 |
| 4,678,954 | 7/1987 | Takeda | 310/261 |
| 4,888,513 | 12/1989 | Fratta | 310/216 |
| 4,924,130 | 5/1990 | Fratta | 310/261 |
| 5,191,256 | 3/1993 | Reiter, Jr. | 310/216 |

*Primary Examiner*—R. Skudy
*Attorney, Agent, or Firm*—Donald F. Scherer

[57] ABSTRACT

A rotor assembly for a synchronous reluctance dynamo/motor machine has a plurality of axial laminations comprised of alternate magnetic and non-magnetic materials. The rotor has an end cap on each axial end which engages the stepped axial ends of the laminations.

12 Claims, 4 Drawing Sheets

COMPOSITE ROTOR FOR A SYNCHRONOUS RELUCTANCE MACHINE

TECHNICAL FIELD

The present invention relates generally to synchronous speed dynamo/motor machines. More particularly, the present invention relates to reluctance type dynamo/motor machines. Specifically, the present relates to the construction of rotors for such machines.

BACKGROUND OF THE INVENTION

It is to be understood that the present invention relates to generators as well as to motors—hence, the dynamo/motor machine designation. However, in order to obviate the arduous writing style that would result by constantly referring to both types of machines, the description that follows will most frequently be styled as pertaining to a motor, but it will be understood that the invention relates to both motors and generators. With that preamble, it can be stated that a synchronous reluctance motor is a synchronous machine that has a stator with poly-phase windings forming a plurality of poles which are similar to induction motors. The reluctance motor also includes a rotor that does not use windings or permanent magnets but does have the same number of poles as the stator. The rotor is manufactured as an anisotropic structure. That is, each pair of poles of the motor has a direction of minimum reluctance, the direct axis, and a direction of maximum reluctance, the quadrature axis.

A synchronous reluctance motor (SYR) is similar to other synchronous motors with the distinct difference of having no DC excitation. That is, the motor does not have brushes and slip rings. The stator windings of the SYR are substantially identical with those employed in poly-phase induction motors with the added advantage of efficiently operating with concentric windings which are similar to the salient pole windings used in DC motors. The rotors of the SYR are constructed to have different values of reluctance between the direct and quadrature axes. This provides an easy flux path for the direct axis as compared to the quadrature axis. The magnetic performance index ratio (direct axis to quadrature axis reluctance) affects the performance of the SYR. The higher the ratio, the better the performance of the SYR. Conventional reluctance motors exhibit a performance index ratio of approximately five (5).

By providing a rotating field in the stator windings a magnetomotive force is created in the rotor which results in an attempt to align with the magnetomotive force generated in the stator. The rotor tends to displace the direct axis of minimum reluctance until the alignment of the fields is attained resulting in the rotor being driven at a synchronous speed proportional to the rotating field in the stator. In order that the maximum power can be derived from the motor, it is desirable to maximize the ratio of the direct-to-quadrature axis reactance. This is generally accomplished by utilizing magnetic laminations alternatingly interleaved with non-magnetic and non-conducting separators inserted axially between radially extending arms. The arms are formed with a smooth, U-shaped recess therebetween, the laminations being secured within each recess. The laminations are secured in situ by means of radial fasteners and end caps. The end caps are cup-shaped members with an axially extending outer rim that is disposed circumjacent the outermost periphery of the laminations. These motors will operate at higher efficiencies than induction motors and will also provide higher operating speeds.

SUMMARY OF THE INVENTION

It is, therefore, a primary object of the present invention to provide an improved dynamo/motor machine that can be generally designated as an improved synchronous reluctance machine.

It is another object of the present invention to provide an improved rotor for a synchronous reluctance machine wherein the rotor has centrifugal retainment end caps.

It is a further object of the present invention to provide an improved rotor, as above, having end cap members that permit increased operating speed.

It is yet another object of the present invention to provide an improved composite rotor and non-magnetic and non-conducting separators for use in conjunction with a synchronous reluctance machine, the improved rotor providing high mechanical strength characteristics and improved magnetic isolation.

It is still another object of the present invention to provide an improved composite rotor, as above, wherein eddy current losses in the rotor are reduced.

It is a further object of the present invention to provide an improved, composite rotor, as above, having end caps that provide improved radial support for the rotor laminations.

It is yet a further object of the present invention to provide an improved glass fiber composite rotor, as above, having a star-like configuration with the S-glass, or carbon, fibers being oriented to provide optimization of the stress distribution.

It is a still further object of the present invention to provide an improved, composite rotor, as above, that can be employed in conjunction with a synchronous reluctance machine to provide a significantly increased rotor saliency ratio, to reduce the rotor inertia and thereby provide greater response for advanced variable speed applications and to provide a magnetic performance index (ratio of direct-axis to quadrature-axis reactance) greater than eight (8.0).

These and other objects of the invention, as well as the advantages thereof over existing and prior art forms, which will be apparent in view of the following detailed specification, are accomplished by means hereinafter described and claimed.

The present invention seeks to increase the maximum operating speed of synchronous reluctance machines. This result is primarily accomplished by providing a unique rotor assembly that includes laminations and special end caps, both of which have a novel configuration. The assembly has a rotor that is fabricated with a composite core that may be molded of high tensile strength S-glass, carbon fiber or an optimum layer of both. The rotor core includes a body portion with equiangularly spaced, radially extending arms. The reinforcing fiber glass strands are laid-up with the strands oriented both axially and transversely to the rotational axis of the rotor. This orientation provides improved operating characteristics.

A concave, or U-shaped, axially extending recess is formed between adjacent arms. The recesses are filled with alternate laminations of magnetic and non-magnetic materials such as iron and high tensile fiber glass, which laminations are secured to the core, and each other, with high temperature cure epoxy and with radially installed, threaded fasteners. The axial ends of each arm are stair-stepped such that the length of each successive, radially outward step is axially reduced. The laminations in the recesses between adjacent arms have a length equal to the axial length of the arm at equal radial dimensions. Thus, the core sub-assembly, comprised of the composite core, laminations and fasteners, has axial end surfaces which present a plurality of circumferential steps.

Each axial end is enclosed by an end cap having a plurality of circumferential steps that are complementary to the axial ends of the core sub-assembly. A radially disposed, circumferential support wall is provided for the laminations at each step surface. The end caps are secured on the sub-assembly by a plurality of fastening devices that extend axially through the composite core. This structure improves the resistance of the rotor assembly to radial expansion resulting from centrifugal forces. Rotors constructed in accordance with the concepts of the present invention will, therefore, permit increased operating speed as compared with previously known synchronous reluctance machines.

In general, a dynamo/motor machine incorporating the concepts of the present invention has a rotor that is comprised of a composite core and a plurality of alternately spaced magnetic and non-magnetic axial laminations. The laminations are generally U-shaped in cross-section between radially extending arms on the rotor. The rotor construction contributes to a direct-axis to quadrature-axis reactance ratio exhibiting a minimum value of approximately eight (8.0) and a maximum ratio of greater than approximately fifteen (15.0). These ratio values are dependent on the thickness of the non-magnetic spacers to that of the steel laminations.

The ends of the rotor, core and laminations, are formed to provide cylindrically stepped portions that decrease in axial length as the radial distance from the center of the core increases. A pair of end caps each have a complementary surface mating with the rotor ends. The overlapping arrangement of the complementary surface adds to the strength of the rotor in resisting the centrifugal forces.

To acquaint persons skilled in the arts most closely related to the present invention, one preferred embodiment thereof that illustrates a best mode now contemplated for putting the invention into practice is described herein by, and with reference to, the annexed drawings that form a part of the specification. The exemplary composite rotor for synchronous reluctance machines is described in detail without attempting to show all of the various forms and modification in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

DESCRIPTION OF AN EXEMPLARY EMBODIMENT

Figure 1:
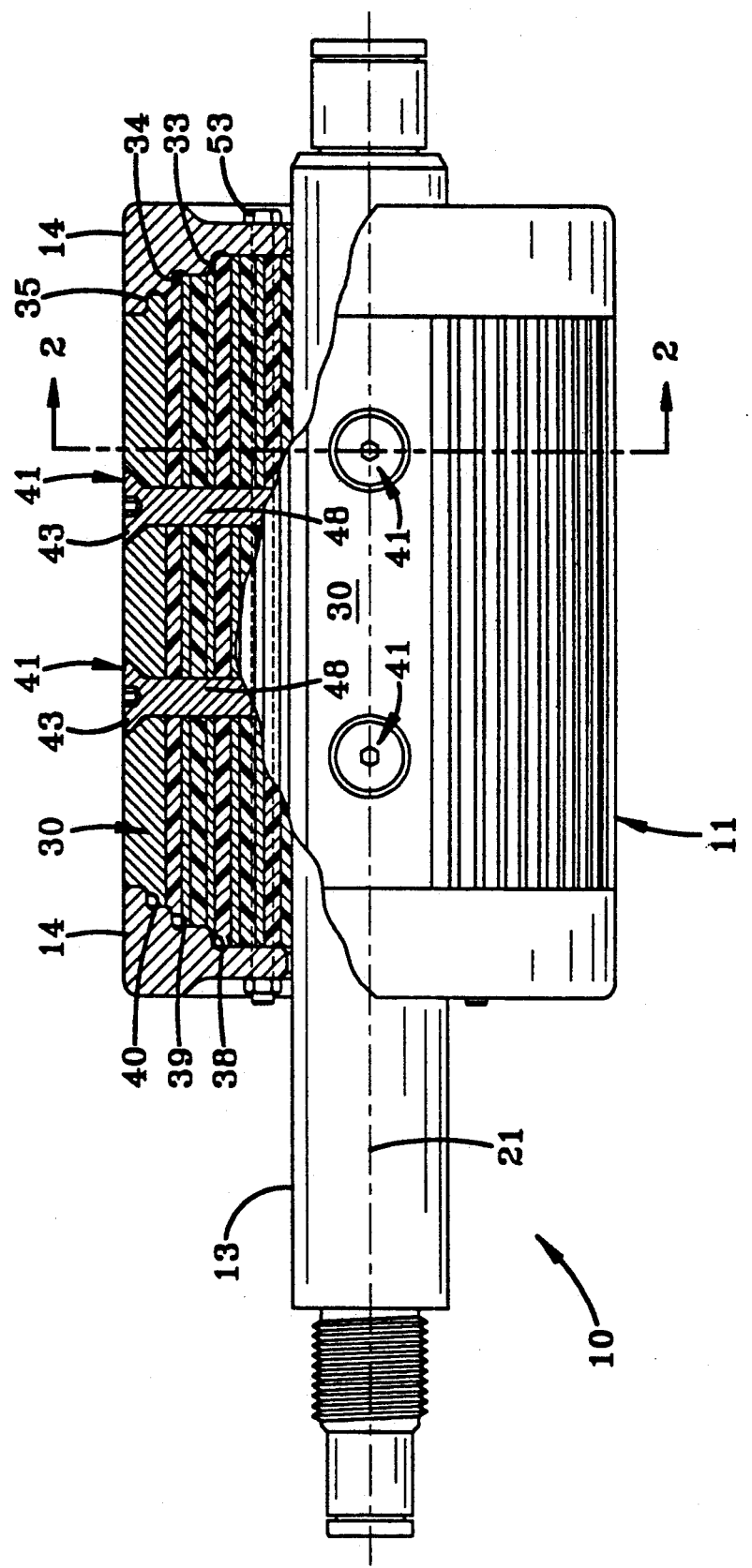
FIG. 1 is an elevational view, partly in section, of a rotor incorporating the present invention.
Figure 2A:
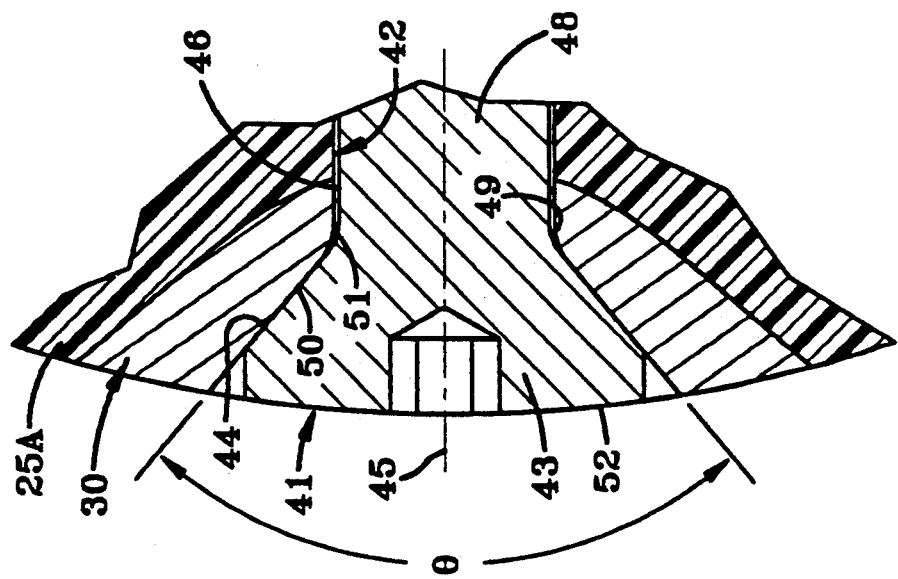
FIG. 2A is an enlarged area of that portion of the cross section depicted in FIG. 2 defined generally by the circle designated as "FIG.-2A" therein.
Figure 2:
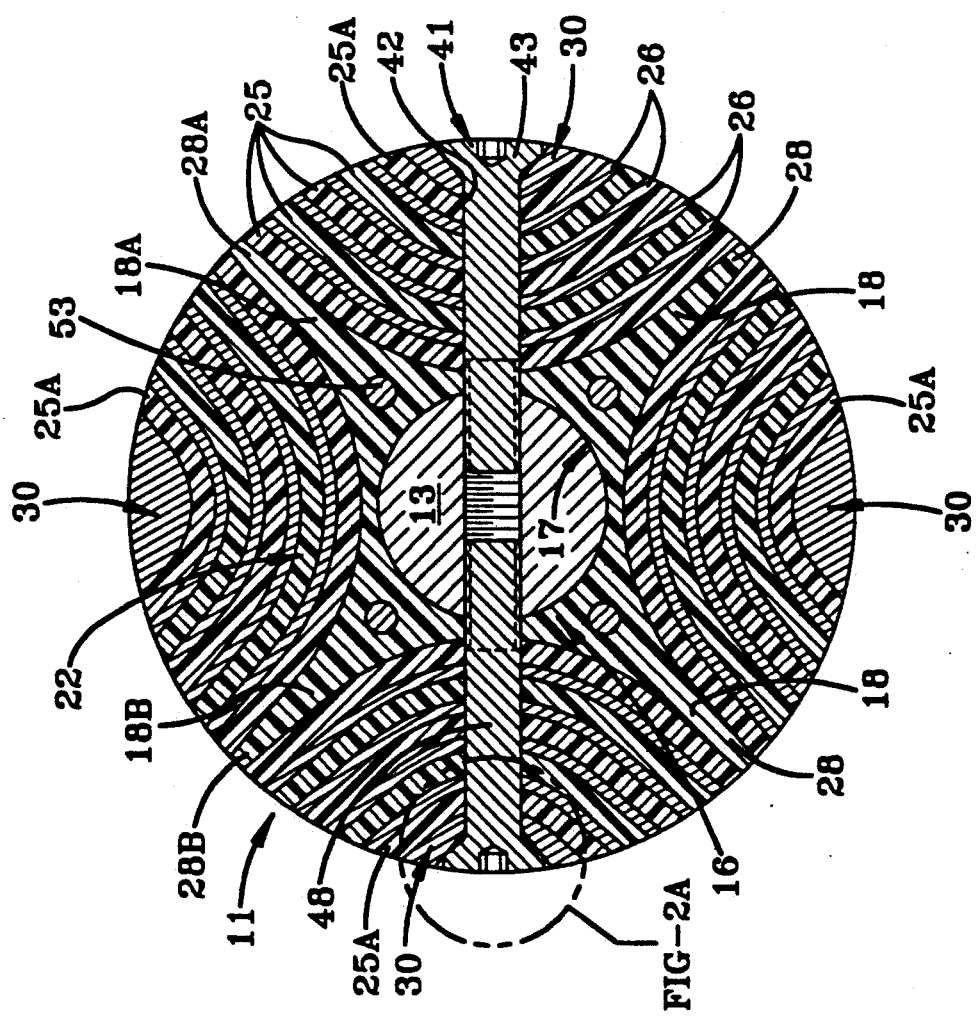
FIG. 2 is a sectional view taken substantially along line 2—2 of FIG. 1.
Figure 3:
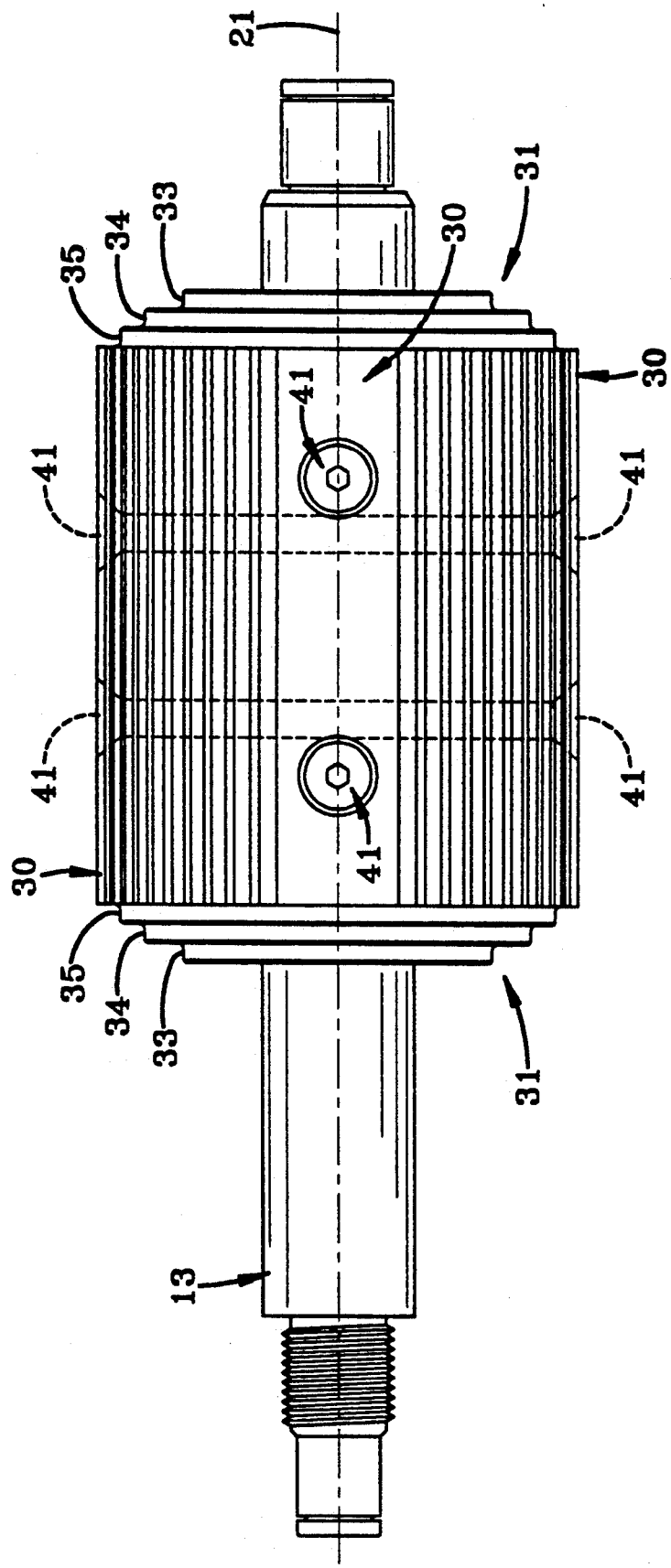
FIG. 3 is an elevational view of a rotor with the end caps removed depicting the axial ends of the rotor.
Figure 5:
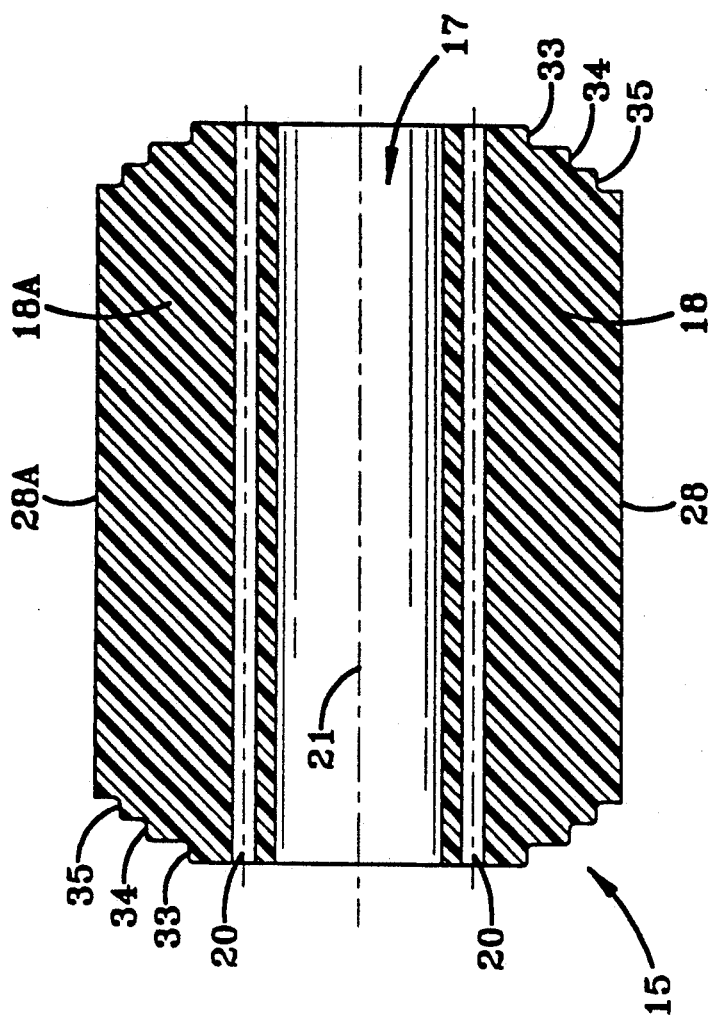
Figure 4:
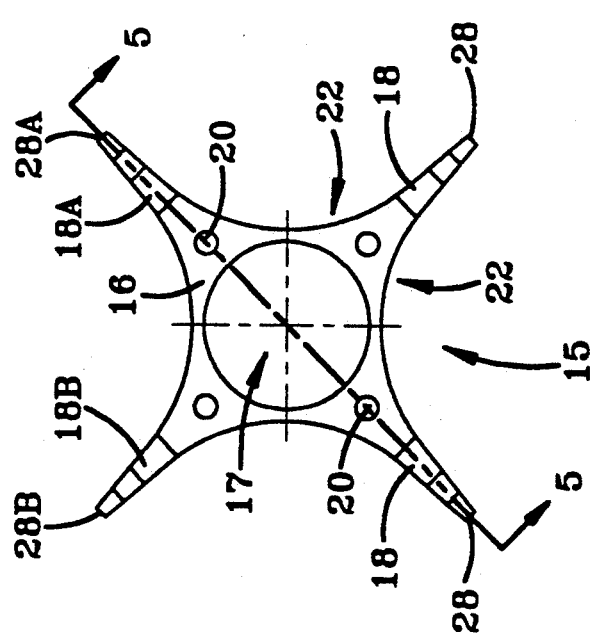
FIG. 4 is an end view of a composite core used in conjunction with the present invention; and, FIG. 5 is a sectional view taken substantially along line 5—5 of FIG. 4.

Referring to the drawings wherein like characters represent the same or corresponding parts throughout the several views, one representative form of a rotor assembly adapted for use in conjunction with a synchronous reluctance machine, and embodying the concepts of the present invention, is designated by the numeral 10 on the accompanying drawings. The rotor assembly 10 is comprised of a rotor 11 carried on a shaft 13 and fitted with pair of end caps 14 that secure the core to the supporting shaft 13 and assure radial integrity of the rotor 11 relative to the shaft 13. As best seen in FIGS. 2 and 4, the rotor 11 has a star-shaped core 15. The core 15 has a body portion 16 with a central axial bore 17 extending therethrough. Four, equiangularly spaced arms 18 radiate outwardly from the body portion, and a passage 20 extends axially through each arm 18. The core 15 is preferably a composite member constructed of high tensile fiber glass which is laid up with the fibers oriented axially and transversely with respect to the central, longitudinal axis 21 (FIG. 3) of the rotor assembly 10. Valleys 22, which extend the full axial length of the core 15, are disposed between the adjacent arms 18, and each valley 22 has a substantially U-shaped cross section.

The rotor 11 also includes a plurality of magnetic laminations 25 and non-magnetic, or separator, laminations 26 which fill the valleys 22. The laminations 25 and 26 are alternately disposed to provide a plurality of flux paths through the rotor 11 which cooperate with a conventional stator, not shown, to provide the motive, or reactive, forces for the machine. The magnetic laminations 25 are preferably constructed of high silicon, grain-oriented steel. The grain of the steel is oriented in the transverse direction relative to the longitudinal axis 21. In other words, the grain orientation is from the tip 28A of arm 18A to tip 28B of arm 18B. The high silicon steel has electrical properties that improve the field efficiency of the machine, thereby improving machine performance and reducing the maximum normal operating temperature.

As previewed in the previous paragraph, and as will appear in the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of a letter suffix employed in combination with the numerical designation employed for general identification of that structural member, component or arrangement. Thus, there are at least four arms which are generally identified by the numeral 18, but the specific, individual arms are, therefore, identified as 18A and 18B in the specification and on the drawings. This same suffix convention shall be employed throughout the specification.

The non-magnetic laminations 26 are constructed with high tensile fiber glass and high temperature curing epoxy. This provides for stable properties in the glass laminations 26 and the core 15 when the machine is operating at normal operating temperatures with a satisfactory safety factor. The epoxy bond in the laminations 26 aids in securing the magnetic laminations 25 in place. As with the core 15, the laminations 26 are preferably applied with the strands of the fiber glass being oriented in the axial and transverse directions. The axial orientation of the fiber glass strands aids the critical speed of the assembly, whereas the transverse orientation of the fiber glass strands improves the resistance to centrifugal forces. Both of these characteristics improve the maximum operating speed of the motor. The non-magnetic laminations 26 can be formed with aluminum. However, aluminum will have some eddy current losses as a result of the stator field harmonics. Inasmuch as these currents reduce the overall efficiency of the motor, the selected construction is believed to be an improvement over the prior art relating to synchronous reluctance machines.

The outermost lamination 25A in each valley 22 has a rotor bar 30 disposed adjacent thereto. The rotor bar 30 is preferably also a composite member. The bar 30 is preferably constructed with a carbon fiber center and a high tensile strength fiber glass outer layer. The carbon fiber improves the strength of the rotor bar 30, and the glass layer prevents any current flow which might occur because of the stator field applied to the magnetic laminations 25. An identical carbon fiber and high tensile strength fiber glass construction can be used in the non-magnetic laminations 26, if desired. Such construction would further improve the maximum operating speed of the machine.

The axial ends 31 of the rotor 11 have circumferential steps 33, 34 and 35 formed thereon. The end caps 14 have complementary step portions 38, 39 and 40 formed therein. The end caps 14 overlap the axial ends of the rotor and with the steps 33 through 35 engaged, respectively, by the complementary step portions 38 through 40 to provide supporting surfaces that increase the centrifugal strength of the rotor 11. End caps 14 may be most economically made of aluminum. However, titanium, which has virtually the same magnetic characteristics as aluminum, does provide better strength characteristics than aluminum, and is, therefore, better suited for use with machines intended for high speed applications. It should also be appreciated that filament wound end caps, while having higher manufacturing costs, are capable of providing the best overall performance.

The overlapping of the complementary steps 38 through 40 on the end caps 14 with the circumferential steps 33 through 35 on the rotor 11 lends the greatest improvement to the high speed characteristics of the machine. The steps 33 through 35 of the rotor 11 are formed after assembly of the laminations 25 and 26, and rotor bars 30, into the core 15. The laminations 25 and 26 as well as the rotor bars 30 are secured to the core 15, and the supporting shaft 13, by threaded fasteners 41. The threaded fasteners 41 are preferably bolts that are fabricated from a beryllium-copper alloy, the bolts 41 having a unique head configuration which provides an unexpected interaction with the receiving bore 42 in each rotor bar 30 to provide as much as twice the strength of a conventional, stainless steel bolt. As best seen in FIG. 2A, the head portion 43 of the bolt 41 presents a conically flared engaging surface 44. The engaging surface 44 is preferably symmetrical with the central axis 45 of the bolt 41 and is flared at an angle Θ that is preferably on the order of 100 degrees. The conically flared engaging surface 44 intersects the cylindrical outer surface 46 of the shaft portion 48 of the bolt 41 in a filet 49.

The receiving bore 42 in the rotor bar 30 presents an upwardly facing (as oriented in FIG. 2A) conically flared, engaging surface 50. The engaging surface is also flared symmetrically at an internal angle Θ in order to permit the flared engaging surface 44 on the bolt 41 matingly to engage the flared surface 50 in the receiving bore 42 on the rotor bar 30. As will become apparent, the force transfer between the bolt 41 and the motor bar 30 is transferred in substantially its entirety between the flared engaging surfaces 44 and 50. This result is assured by the configuration of the juncture between the receiving bore 42 and the engaging surface 50. Specifically the convex juncture presents a fillet 51 that has a lesser radius than the radius of fillet 49. For example, in the situation where the bolt 41 has a shaft portion 48 measuring approximately ¼ inch in diameter, the fillet 49 may have a 0.08 inch radius in comparison to radius of 0.10 inches for the fillet 51. With such dimensions, the flared engaging surfaces 44 and 50 effect the force transfer between the bolt 41 and the rotor bar 30 without physical engagement between the fillets 49 and 51.

In order to preclude undesired engagement between the head portion 43 of the bolt 41 and the stator, not shown, when the rotor assembly 10 if rotating, the outer surface 52 on the head portion 43 is preferably of spherical configuration with the radius being substantially equal to the radius of the rotor assembly 10. In the representative embodiment depicted, the radius of the outer surface may be on the order of 2.5 inches, which is substantially equal to the radius of the rotor assembly 10. The result to be achieved is that the outer surface should not extend radially outwardly beyond the outer surface of the rotor 10 when the rotor assembly 10 is completed for use in a synchronous reluctance machine.

The end caps 14 may be secured in place by threaded fasteners 53 which extend axially between the end caps 14, through the passages 20. As previously explained herein, the end caps 14 may also be filament wound. Should one elect to utilize filament would end caps, the efficiency of the rotor 11 would be even further improved by eliminating a ground path through the end caps 14. The use of filament wound end caps 14 would also permit the elimination of the threaded fasteners 53. That is, filament wound end caps 14 could be bonded to the remainder of the laminate structure comprising the rotor 11.

The circumferential steps 33 through 35 are preferably ground into the rotor 11 after the laminations 25 and 26 and rotor bars 30 are assembled to the core 15. The fasteners 41 will provide the necessary retention of the components of the assembly while the ends 31 are ground. Other manufacturing methods have been considered. One such manufacturing method includes the assembly of the core 15, the laminations 25 and 26 and the rotor bars 30 with a layer of heat curing epoxy between adjacent components. The assembly is then passed through an induction heater which induces hardening of the epoxy. This is followed by the machining of the ends 31 to provide the circumferential steps 33 through 35. The epoxy bond also resists the centrifugal forces acting on the rotor 11 during operation of the synchronous reluctance machine in which the rotor is employed, as do the fasteners 41. Another method of assembly that has been considered is to assemble the laminations 25 and 26 and the rotor bars 30 in place relative to the core 15, and then securing the assembly with a circumferential clamp while the ends 31 are machined. The end caps 14 are then installed and the clamp removed. This method reduces the manufacturing time and cost, but the maximum speed attainable may be reduced.

The high silicon steel used for the magnetic lamination 25 results in a very high magnetic performance index ratio—viz.: in the range of approximately 15.6. The composite separator laminations 27 and core 15 structure contribute to the improved speed characteristics and reduced eddy current losses. Also contributing to the high speed characteristic of the improved synchronous reluctance machine is the unique end cap structure. This end cap structure is perhaps the most significant feature contributing to the high speed capabilities of the motor. Synchronous reluctance machines constructed in accordance with the present invention have been operated at speed in excess of 16,000 revolutions per minute (rpm) and are expected to be capable of operating speeds in the range of 25,000 to 30,000 rpm with power levels greater than 150 horsepower.

The foregoing description of the exemplary embodiment of the invention has been presented for the purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A composite rotor assembly for a synchronous reluctance machine, said composite rotor assembly comprising;
    a supporting shaft member;
    a core carried on said supporting shaft member;
    said core having a body with equiangularly spaced, radially extending arm means defining axially extending supporting cavities between adjacent arm means;
    a plurality of axially extending magnetic laminations disposed in the cavities;
    a plurality of axially extending non-magnetic laminations disposed in the cavities and being interspersed with the magnetic laminations;
    said core and said laminations defining a plurality of cylindrical end surfaces with a radially inner end surface having a greater axial length than a adjacent radially outer end surface; and,
    end cap means secured in covering relation with each end surface and including surface mating with and being complementary to the end surfaces defined by said core and laminations.

2. A composite rotor assembly, as set forth in claim 1, wherein:
    said core is comprised of high tensile strength fiber glass strands with the strands of fiber glass laid-up in perpendicular orientation with some strands extending along a rotational axis of the rotor assembly.

3. A composite rotor assembly, as set forth in claim 1, further comprising:
    a rotor bar secured adjacent an outermost lamination and having end surfaces complementary to said end cap means mating surface which are overlapped by said end cap means.

4. A composite rotor assembly, as set forth in claim 3, wherein:
    said end cap means overlie said rotor bars, said laminations and said core to effect a significant increase in rotor saliency ratio and reduce rotor inertia.

5. A composite rotor assembly, as set forth in claim 3, further comprising:
    fastening means attached to said core;
    fastening means having a head portion and a shaft portion;
    a receiving bore penetrating said rotor bar to receive said shaft portion therethrough and to interact with said head portion;
    a conically flared, engaging surface presented by said receiving bore;
    a conically flared, engaging surface presented from said head portion to engage said conically flared engaging surface presented from said receiving bore.

6. A composite rotor assembly, as set forth in claim 5, wherein:
    said conically flared engaging surfaces are symmetrical; and
    an internal angle of said conically flared engaging surface is equal to approximately 100 degrees.

7. A composite rotor assembly, as set forth in claim 5, wherein:
    said composite rotor is cylindrical and has a assembly radius;
    said head portion of the fastening means terminates in an outer surface;
    said outer surface on said head portion being spherical and thereby having a radius;
    the radius of said spherical outer surface being substantially equal to the radius of said rotor assembly.

8. A composite rotor assembly, as set forth in claim 5, wherein:
    said conically flared engaging surfaces constitute sole means by which to effect force transfer between said fastening means and said rotor bar.

9. A composite rotor assembly, as set forth in claim 8, wherein said fastening means comprises:
    a beryllium-copper alloy.

10. A composite rotor assembly for a synchronous reluctance machine, the composite rotor assembly comprising:
    a supporting shaft member;
    a core supported by said shaft member;
    said core having a body with equiangularly spaced, radially extending arm means defining axially extending supporting cavities between adjacent arm means;
    a plurality of axially extending magnetic laminations disposed in the cavities;
    a plurality of axially extending non-magnetic laminations disposed in the cavities and being interspersed with the magnetic laminations;

a rotor bar disposed axially adjacent a radially outermost lamination in each cavity defining a portion of an outer surface of the rotor assembly;

means for securing said rotor bars to said shaft member;

said core laminations and said rotor bars defining a plurality of circumferentially stepped end surfaces with a radially inner step surface having a greater axial length than an adjacent radially outer step surface; and, end cap means secured in covering relation with each end surface and including surface means mating with, and being complementary to, said circumferentially stepped end surfaces defined by said core and said laminations.

11. A rotor assembly, as set forth in claim 10, wherein:

said rotor bars are constructed with non-magnetic material.

12. A composite rotor assembly, as set forth in claim 10, wherein:

said core and said non-magnetic laminations are comprised of high tensile strength fiber glass strands, the fiber glass strands laid-up in perpendicular orientation with some strands extending along a rotational axis of the rotor assembly and other fiber glass strands extending transversely with respect to the rotational axis and being located in said cavities between adjacent arm means of said core.

* * * * *